United States Patent [19]
Bard et al.

[11] Patent Number: 5,131,597
[45] Date of Patent: Jul. 21, 1992

[54] IRRIGATION SYSTEM WITH FLOW REGULATION

[75] Inventors: Shannon Bard, Wheeling, Ill.; Thomas N. Prassas, Glendale, Ariz.

[73] Assignee: Aquapore Moisture Systems

[21] Appl. No.: 711,136

[22] Filed: Jun. 6, 1991

[51] Int. Cl.⁵ .............................................. A01G 25/02
[52] U.S. Cl. ........................... 239/145; 234/542; 234/547; 234/590.3
[58] Field of Search ............ 239/542, 547, 590, 590.3, 239/266–269, 145

[56] References Cited

U.S. PATENT DOCUMENTS

| | | | |
|---|---|---|---|
| 1,104,580 | 7/1914 | Tregoning | 239/266 |
| 2,314,525 | 3/1943 | Summers | 239/269 |
| 2,598,961 | 6/1952 | Andrus | 239/542 |
| 2,755,985 | 7/1956 | Finegan | 239/547 |
| 2,757,966 | 8/1956 | Samiran | 239/266 |
| 2,904,809 | 9/1959 | Clayson | 239/547 |
| 3,361,359 | 1/1968 | Chapin | 239/269 |
| 3,973,732 | 8/1976 | Diggs | 239/547 |
| 4,161,290 | 7/1979 | Hill | 239/542 |
| 5,069,388 | 12/1991 | Prassas et al. | 239/542 |

Primary Examiner—Andres Kashnikow
Assistant Examiner—Karen B. Merritt
Attorney, Agent, or Firm—Marvin E. Jacobs

[57] ABSTRACT

An irrigation system that combines porous and non-porous tubing in a unified system by means of pressure reducing flow control fittings that connect the lower pressure porous tubing to the higher pressure non-porous distribution tubing. Small holes in discs mounted inside the fittings lower the flow and pressure to the porous tube.

4 Claims, 1 Drawing Sheet

5,131,597

IRRIGATION SYSTEM WITH FLOW REGULATION

DESCRIPTION

1. Technical Field

This invention concerns the field of irrigation systems that use porous pipe as line source water emitters, sometimes called soaker hose. Also, this invention concerns non-porous pipe irrigation systems that feed point source water emitters connected at selected locations on the pipe. More specifically, a design is disclosed to integrate both porous and nonporous pipe into a single system that enhances the advantages of both.

2. Background of the Invention

The best contemporary systems to efficiently water plants utilize pipe or tubing to carry water close to each plant to be watered so as to conserve water. Large area sprinkling or broadcasting mechanisms are avoided since these result in excessive evaporation and surface runoff.

Two prior art systems have evolved to directly water plants, each having advantages in some circumstances. One system uses impervious pipe, often made from vinyl or polyethylene plastic, to distribute water throughout a garden area with a variety of point source emitters attached to the pipe at desired locations so as to drip or spray water in the exact amount, pattern, and place desired. The other system uses porous pipe or soaker hose that sweats water along its entire length to provide a line source water emitter that is well suited to distribute water directly to the ground at the base of plants with a minimum of loss to evaporation and runoff.

Impervious pipe carries water at higher pressures over greater distances and allows the choice of a point source emitter that is ideal for the watering task at each discrete location. Point source emitters may have different flow rates, spray or drip patterns, and positions thus offering great flexibility. Porous pipe, on the other hand, is durable and flexible and can be buried or made to follow unusual shapes. It is simpler to assemble and maintain, does not cause erosion, and does not splash in unwanted areas.

To obtain the benefits of both systems, it is desirable to use both porous and impervious pipe in a single water circuit. This is generally not possible, however, since the higher pressures needed to properly operate point source emitters causes excessive leakage from conventional porous pipe. One way to solve this problem is disclosed in our copending patent application Ser. No. 07/491,818, filed Mar. 12, 1990 by the current inventors and issued as U.S. Pat. No. 5,069,388. This copending application teaches a method to fabricate porous hose that works properly under elevated pressures and the content of this application is hereby incorporated by reference into the present application.

The present invention avoids the necessity of utilizing specially designed soaker hose but still allows porous and impervious pipe to be joined into a single system. Accordingly, the end user may use already purchased or conventional porous pipe in combination with impervious pipe to create a system having all the watering characteristics conceivable.

SUMMARY OF THE INVENTION

In brief, the present invention discloses an integrated porous and non-porous tubing irrigation system that uses the non-porous tube as a supply and distribution line. The higher pressures of the impervious tube enables one to serve a larger system and more emitters and porous tubes without increasing the pipe size. The porous pipe portions of the irrigation system are connected to the distribution line through fittings that include a pressure and flow regulator that lowers the water flow and pressure to levels appropriate for the porous pipe, typically 5–10 psi, so that excessive and uneven leakage along the soaker hose is prevented.

For watering tasks that are best met with point source emitters, additional branches of impervious tube can be added in a manner well known to those in the art so as to support them. The point source emitters can be attached to these branches or to the supply line as is convenient. Further details, advantages, and benefits will become apparent from the following drawing and explanation.

DETAILED DESCRIPTION OF THE INVENTION

Figure 1:
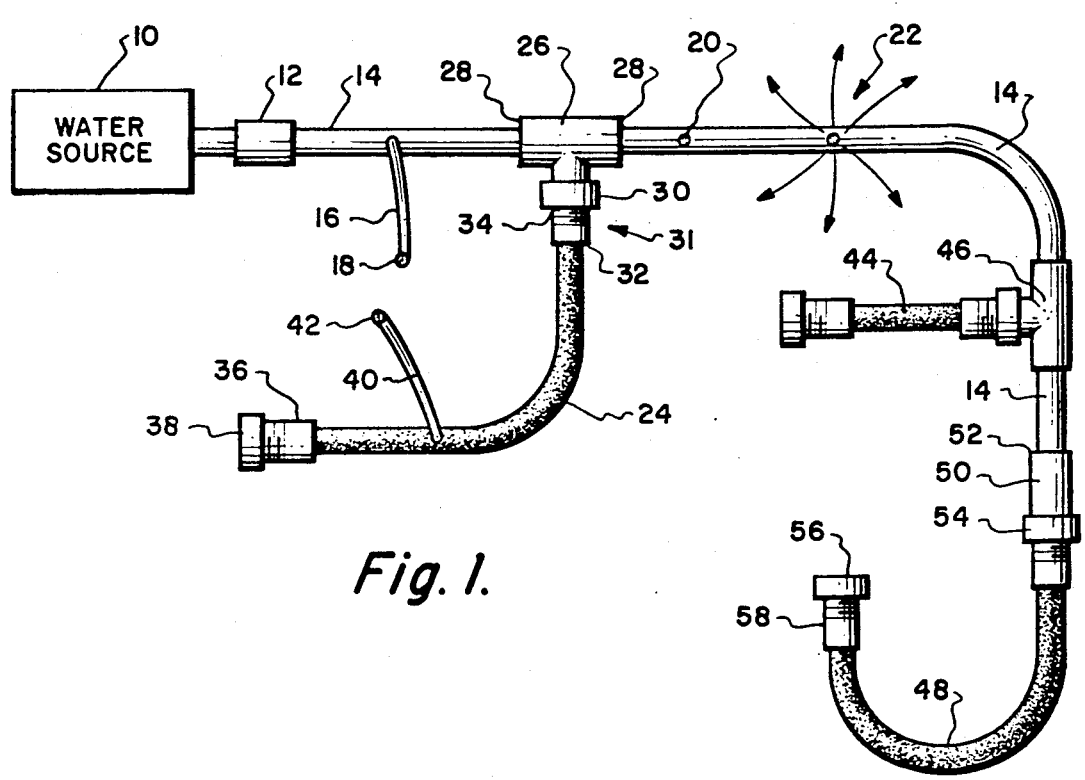
FIG. 1 schematically shows an integrated irrigation system with both porous and impervious tubing connected together by pressure controlling fittings and also showing examples of some joint source emitter attachments.

An abbreviated exemplary water irrigation system is shown in FIG. 1. Water from a source 10 passes through an optional pressure regulator 12 to a distribution tube 14 constructed of impervious material such as polyethylene and thus often called poly tube. Smaller vinyl or poly tubing 16 may be connected to tube 14 at desired locations to supply an emitter 18. Such connections are typically made with a hollow barbed fitting that is inserted through the tube wall in a manner well known to those skilled in the art. Likewise, other emitters may be attached to the main poly tube as schematically shown by a drip emitter 20 and a spray emitter 22. Other poly tube branches could split off from tube 14 to feed other emitters as well although such branches are not included in FIG. 1.

A porous tube 24 branches off the distribution line 14 by means of a fitting 26. Fitting 26 is called a swivel tee in the art, comprising a pair of compression rings 28, into which tube 14 is inserted, and a turnable female threaded hose connector 30. Porous tube 24 slides into a fitting 31 with a compression ring 32 and a male threaded portion 34 that screws into connector 30. Compression ring fittings and threaded connectors of this type are readily available in the art and not part of the instant invention. Other combinations of connecting parts may occur to those skilled in the art. Tube 24 may be terminated with another compression ring and male threaded connector 36 screwed into a cap 38. If desired, a tube 40 and emitter 42 may also be inserted into porous tube 24 if operation at the lower porous tube pressures is acceptable to the user.

In a similar fashion, another porous tube 44 is shown branching off distribution line 14 at a different location by means of a swivel tee 46. Still another porous tube 48 is connected to the end of line 14 with a fitting 50 that has a compression ring 52 at one end and a rotatable female hose thread connector 54 at the other end. Alternatively, line 14 could be simply terminated itself with the cap 56 and fitting 58 that terminate porous hose 48 in FIG. 1. The fittings 26, 31, and 50 are shown in greater detail in FIG. 2.

Figure 2:
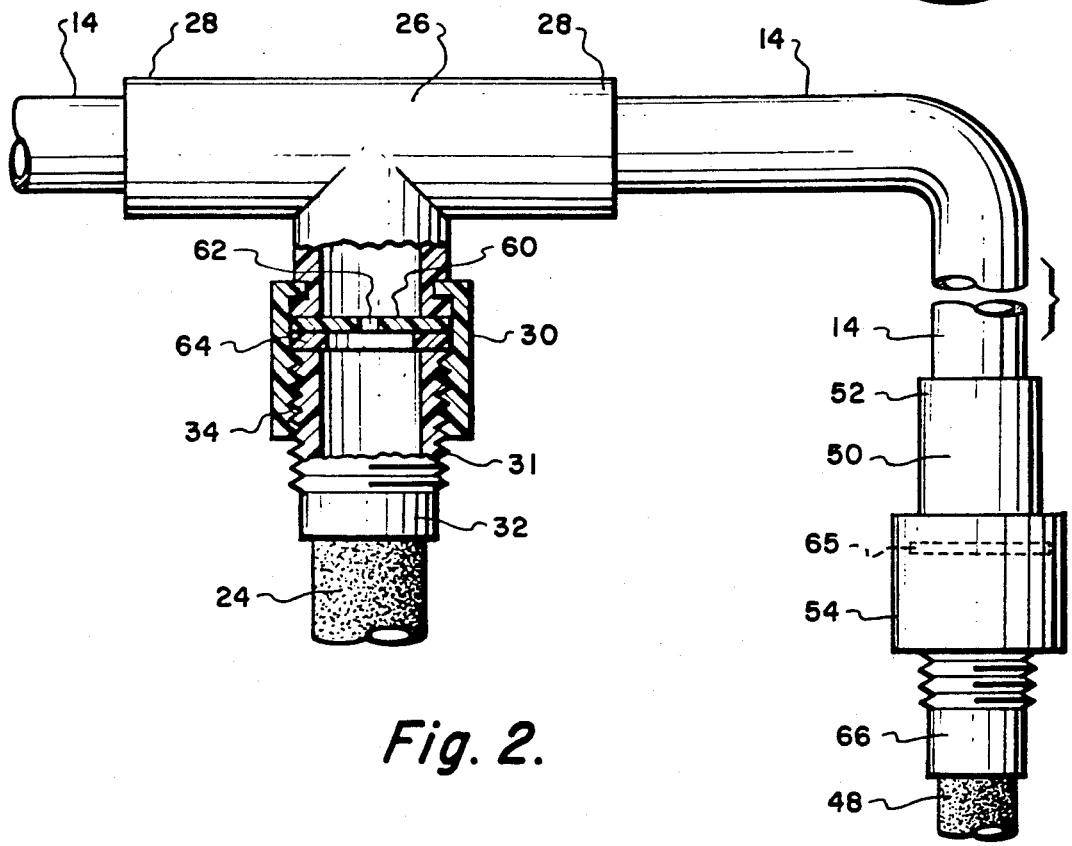
FIG. 2 is an enlarged elevational view of the fittings that join the porous pipe to the impervious distribution line with one of the fittings partly cut away to better reveal the flow and pressure reducing mechanism therein.

In FIG. 2, the tee part of fitting 26 and the threaded part of fitting 31 are partially cutaway to better show the interior flow and pressure regulating disc 60 therein. Disc 60 has a carefully sized flow restricting hole 62 that operates to control the rate of flow of the water into porous tube 24. With a reduced and controlled flow, a normally porous tube 24 stabilizes to a working pressure of 5-10 psi. In irrigation systems that must operate with water having a high content of solids and minerals, the porous hose may, over time, accumulate deposits in the pores that clog it somewhat and reduce the water flow therethrough. When this happens, a higher operating pressure becomes desirable in the porous tube 24. Disc 60 with hole 62, being primarily responsive to flow rate, automatically adapts to and compensates for this clogging effect. Flow rate is maintained and the operating pressure in porous tube 24 stabilizes at a higher level.

Disc 60 may also be thought of as a pressure regulating device because it does normally lower the 20-30 psi pressure in distribution line 14 to the 5 or 10 psi typical for porous hose. Alternative embodiments of the invention may be constructed with other kinds of pressure regulating devices as well. However, pressure regulators that consistently hold the output at a fixed pressure, without being at all responsive to the flow rate, would not be able to automatically adjust to long term clogging of the porous hose. Thus, in the preferred embodiment, a flow regulating device is used to control both flow and, to a degree, pressure so as to work best in all situations.

A washer 64 helps seal the fittings 26 and 31 when they are screwed together. In a like way, a flow and pressure regulating disc 65 is trapped between fitting 50 and fitting 66 for the inline terminating connection. Clearly, the particular arrangement of the fittings is optional with the user provided that a flow and pressure reducing means is included before the introduction of a porous tube portion in the water circuit. Again, other pressure reducing means may be used, but the sized hole in a disc is thought to be the most efficient and economical solution. These and other variations may occur to those skilled in the art which variations fall within the spirit and scope of the invention. Hence, limitation in accordance only with the following claims is appropriate.

We claim:

1. An irrigation system operable to provide combined point source water distribution and line source water distribution, comprising in combination:

higher pressure operable water distribution tubing operable to connected together a plurality of point source water emitters;

a plurality of higher pressure operable point source water emitters adapted to be connected at a plurality of locations on said distribution tubing;

porous water distribution hose operable at a lower pressure than said distribution tubing; and a plurality of fitting means for connecting said porous hose to said distribution tubing at a plurality of locations along said distribution tubing, each of said fitting means adapted to lower the water pressure in said distribution tubing to an amount suitable for said porous hose, each of said fitting means being adaptable to lower the water pressure by means of a water flow blocking disc with a small flow controlling hole therethrough that is positioned within said fitting means.

2. The system of claim 1 in which some of said fitting means comprise multiple port fittings having two ports adapted to be connected to the water distribution tubing and a third portion adapted to connect to said porous hose.

3. The system of claim 2 in which some of said multiple port fittings are tee shaped.

4. The system of claim 1 in which at least one of said fitting means has a port adapted to receive said water distribution tubing and another port adapted to connect to said porous hose.

* * * * *

UNITED STATES PATENT AND TRADEMARK OFFICE
CERTIFICATE OF CORRECTION

PATENT NO. : 5,131,597

DATED : Jul. 21, 1992

INVENTOR(S) : Bard et al.

It is certified that error appears in the above-identified patent and that said Letters Patent is hereby corrected as shown below:

Column 4, line 15, change "connected" to --connect--

Column 4, line 36, change "portion" to --port--

Signed and Sealed this

Thirteenth Day of December, 1994

Attest:

BRUCE LEHMAN

Attesting Officer

Commissioner of Patents and Trademarks